Sept. 7, 1937.  L. W. GREVE  2,092,669
SHOCK ABSORBING PEDESTAL
Filed June 28, 1934
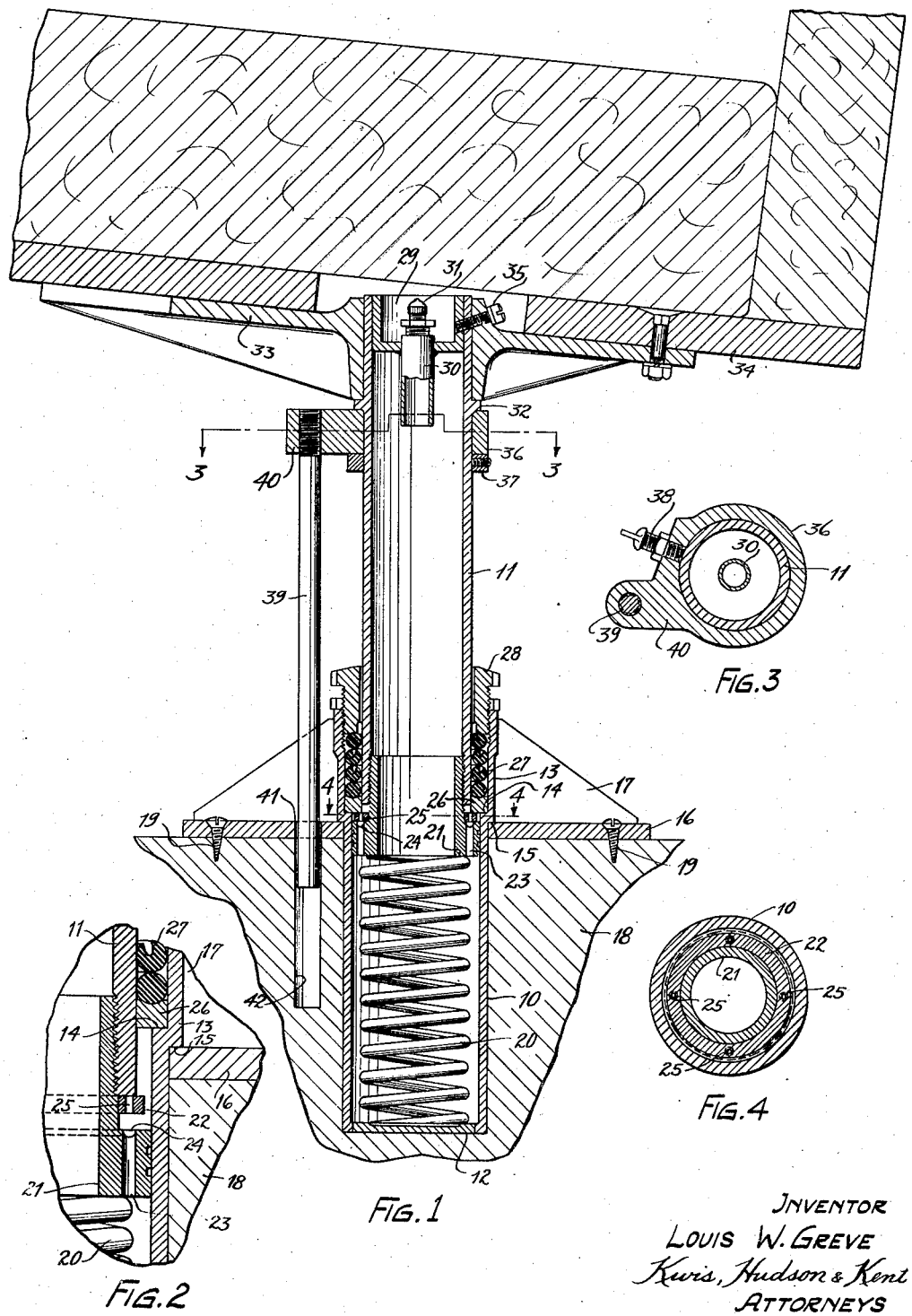
INVENTOR
LOUIS W. GREVE
Kwis, Hudson & Kent
ATTORNEYS Patented Sept. 7, 1937

2,092,669

UNITED STATES PATENT OFFICE 2,092,669

SHOCK-ABSORBING PEDESTAL

Louis W. Greve, Cleveland, Ohio, assignor to The Cleveland Pneumatic Tool Company, Cleveland, Ohio, a corporation of Ohio Application June 28, 1934, Serial No. 732,843

4 Claims. (Cl. 155—52)

This invention relates to improvements in shock-absorbing pedestals, particularly seat supporting pedestals.

One of the objects of the invention is the provision of means for utilizing a shock absorber of the telescoping cylinder type as the support for a vehicle or other seat.

Another object is the provision of a novel means for supporting the lower larger cylinder at the top thereof, with the greater portion of its length projecting into an opening in a floor, utilizing a floor plate attached to the cylinder and connected therewith by rigid brace elements. The mounting of the pedestal at an intermediate position in its length increases rigidity and makes possible the use of smaller diameter or lighter gauge cylinders.

A further object is the provision of means for permitting or preventing relative rotation between the two telescoping cylinders, at the option of the user.

Other objects and features of novelty will appear as I proceed with the description of that embodiment of the invention which, for the purposes of the present application, I have illustrated in the accompanying drawing, in which Fig. 1 is a vertical sectional view of a seat support embodying the invention;

Fig. 2 is a fragmental vertical sectional view showing the position of the valve ring during the compression or impact stroke; and Figs. 3 and 4 are horizontal sectional views taken substantially on the lines 3—3 and 4—4 respectively of Fig. 1.

In the drawing, the two telescoping cylinders which comprise the main elements of my seat support are shown at 10 and 11. The lower and larger cylinder 10 is closed at its lower end by suitable means, such as a plate 12, preferably welded in place. At the upper end of the cylinder 10 there is a portion 13 of increased diameter, and at the junction of these two portions of different diameters there are internal and external annular shoulders 14 and 15 respectively, which have important functions in the invention.

A heavy gauge metal floor plate 16 is formed with a circular opening therethrough to fit the smaller diameter portion of the cylinder 10. In assembly, this plate is pushed over the lower end portion of the cylinder until it engages the shoulder 15. It is then welded to the cylinder in that position. Thereafter several triangular brace plates 17 are placed in the angle between the floor plate 16 and the upper portion 13 of the cylinder and welded to both of those elements, thereby forming an extremely rigid mounting for the upper end of the cylinder. When a pedestal is to be placed in position for use, a hole is made in the floor 18 of proper size to receive the lower smaller diameter portion of the cylinder 10, and the floor plate 16 is caused to rest upon the floor, thereby supporting the cylinder and holding it against any possible tilting movement. If desired, the plate 16 may be secured to the floor 18 by screws 19 or the like.

Within the cylinder 10 there is positioned a heavy coil spring 20 which supports an annular head 21 threadably mounted on the lower end of the upper cylinder 11. The lower part of head 21 has a sufficiently thick wall to slidably engage the inner wall of the small diameter portion of cylinder 10. This thick wall portion is spaced lengthwise a short distance away from the lower end of cylinder 11, and in the groove thus provided I mount a valve ring 22 which is slidable up and down in this groove. The head 21 has a plurality of passages 23 formed in its thick wall portion, which communicate at their upper extremities with an annular groove 24. In the ring 22 there are a plurality of restricted passages 25 which register with the groove 24 when the ring is in its lower position. It will be observed that the ring 22 has an external diameter appreciably less than the internal diameter of the cylinder 10, whereby clearance around the periphery of the ring, between the ring and the cylinder, is provided.

On the internal shoulder 14 there rests a metal ring 26 which forms an abutment for packing 27. The latter is held in position by a packing gland ring 28 which may be threaded into the large diameter part 13 of the lower cylinder to a greater or lesser extent, thereby tightening or loosening the packing 27.

The outer wall of cylinder 11 is spaced inwardly from the inner wall of cylinder 10, as appears clearly in Fig. 2, and the annular chamber formed between these two walls when the shock absorber is compressed, as shown in Fig. 2, has an important function in the operation of the pedestal, as will later appear.

In the upper end of cylinder 11 I mount a plug 29 which is preferably welded in place. Extending through this plug there is a tube 30 which is closed normally by a threaded cap 31. The tube extends downwardly into the cylinder 11 a predetermined distance, which determines the quantity of oil with which the pedestal may be charged. In other words, oil is poured through the tube 30 until it rises to the level of the lower end thereof, whereupon the air trapped in the cylinder above that level prevents further oil flowing into the pedestal.

Near the upper end of cylinder 11 there is formed an annular rib 32 against which rests the hub portion of a seat supporting bracket 33, and upon this bracket there may be mounted a seat frame 34. The bracket is held from turning on the cylinder by means of a screw 35 or the like. A collar or ring 36 is rotatably mounted on the cylinder below the rib 32, and is supported by a collar 37 fixed to the cylinder. The ring 36 may be locked against turning movement upon the cylinder by a screw 38 having wings on its head for easy manipulation. A rod 39 is threaded into a projection 40 on the ring 36 and extends downwardly parallel to the cylinder axes through a hole 41 in the floor plate 16 and into a hole 42 in the floor. The rod 39 moves up and down with cylinder 11, and prevents rotation of that cylinder when the screw 38 is tightened. When that screw is backed off from engagement with cylinder 11, however, the cylinder may obviously turn within the ring, enabling the user to turn the seat around like the seat of a swivel chair.

The shocks of impact are of course taken upon the coil spring 20. During the impact stroke, the valve ring 22 will occupy the position illustrated in Fig. 2, when oil will flow upwardly through the passages 23 around the periphery of valve ring 22, and into the annular space between the two cylinders. Such flow will be very rapid. When the impact stroke is terminated, and the spring 20 begins to return the upper cylinder to its normal position, the ring 22 will immediately seat itself upon the enlarged lower part of the head 21, thereby cutting off flow around the periphery of the ring. The oil trapped in the annular space between the cylinders must then escape entirely through the restricted passages 25 into groove 24 and thence through passages 23. The flow during this stroke will therefore be a metered flow at a lower rate, and the rebound will be correspondingly checked. The number and size of the passages 25 may, of course, be varied to suit the action desired. When there is no load upon the seat, the spring 20 will expand the cylinders to the limit, and they will occupy the relative positions shown in Fig. 1.

In the foregoing description I have necessarily gone somewhat into detail in order to explain fully the particular embodiment of the invention herein illustrated, but I desire it to be understood that such detailed disclosures are not to be construed as amounting to limitations, except as they may be included in the appended claims.

Having thus described my invention, I claim:

1. In a shock-absorbing pedestal, a lower cylinder closed at the bottom adapted to project into an opening in a floor, said cylinder having an upper end portion of increased diameter, internal and external shoulders at the junction point between the two different diameters of the cylinder, a floor plate surrounding the smaller diameter portion of the cylinder and abutting against said external shoulder, means securing said plate to the cylinder, a smaller cylinder telescoping within the lower cylinder, a packing carried by the lower cylinder above said internal shoulder and abutting thereagainst, and shock absorbing means within said cylinders.

2. In a device of the class described, two telescoping cylinders free to rotate relatively to each other, a rod outside the cylinders and parallel thereto, means associated with one of said cylinders for preventing said rod from moving around that cylinder, a ring mounted on the other cylinder with a hole therein receiving said rod, said ring being rotatable upon its cylinder, and releasable means for locking the ring against rotation upon its cylinder.

3. In a shock absorber, two telescoping cylinders, means entirely enclosed within the cylinders for checking shocks, a rod outside of the cylinders and parallel thereto, means fixed to one of the cylinders slidably guiding said rod for longitudinal movement, and means fixed to the other cylinder in which said rod is fixedly mounted, whereby relative rotation of the cylinders is prevented.

4. In a shock-absorbing pedestal, a lower cylinder closed at the bottom adapted to project into an opening in a floor, said cylinder having an upper end portion of increased diameter, a packing in said upper end portion, an external shoulder at the junction point between the two different diameters of the cylinder, a floor plate surrounding the smaller diameter portion of the cylinder and abutting against said shoulder, means securing the floor plate to the cylinder, bracing means between the floor plate and large diameter portion of the cylinder secured to both of those parts, an upper cylinder telescoping within said lower cylinder, and shock absorbing means within said cylinders.

LOUIS W. GREVE.